(12) United States Patent
Schiller

(10) Patent No.: US 9,175,790 B2
(45) Date of Patent: Nov. 3, 2015

(54) COMBINED PROTECTOR AND HOSE SUPPORT DEVICE FOR CONTAINMENT BERM

(71) Applicant: Steven Robert Schiller, Westlock (CA)

(72) Inventor: Steven Robert Schiller, Westlock (CA)

( * ) Notice: Subject to any disclaimer, the term of this patent is extended or adjusted under 35 U.S.C. 154(b) by 90 days.

(21) Appl. No.: 13/773,047

(22) Filed: Feb. 21, 2013

(65) Prior Publication Data

US 2013/0233981 A1    Sep. 12, 2013

(30) Foreign Application Priority Data

Mar. 12, 2012   (CA) ..................................... 2770929

(51) Int. Cl.
| | | |
|---|---|---|
| A62C 13/76 | (2006.01) | |
| A62C 37/50 | (2006.01) | |
| B05B 15/06 | (2006.01) | |
| F16L 3/02 | (2006.01) | |
| A47G 29/00 | (2006.01) | |
| B65D 90/24 | (2006.01) | |

(52) U.S. Cl.
CPC .. *F16L 3/02* (2013.01); *B65D 90/24* (2013.01)

(58) Field of Classification Search
CPC ................. F16L 3/02; F16L 3/01; F16L 3/16; F16L 3/1215; B65D 90/24
USPC ......... 248/75, 77, 78, 79, 80, 81, 82; 138/106
See application file for complete search history.

(56) References Cited

U.S. PATENT DOCUMENTS

| | | | |
|---|---|---|---|
| 307,324 A | | 10/1884 | Pattison |
| 484,557 A | | 10/1892 | Moore |
| 533,113 A | | 1/1895 | Byrkit et al. |
| 742,855 A | | 11/1903 | Garrett et al. |
| 929,392 A | * | 7/1909 | Cole .................. 248/81 |
| 1,192,313 A | * | 7/1916 | Howell .............. 248/81 |
| 1,343,279 A | * | 6/1920 | Reynolds ........ 248/49 |
| 1,493,498 A | * | 5/1924 | Pluym .............. 248/79 |
| 1,574,575 A | | 2/1926 | Harmon et al. |
| 1,721,449 A | * | 7/1929 | Helmeke ...... 239/532 |
| 1,746,151 A | | 2/1930 | Goldman |
| 2,189,364 A | * | 2/1940 | Kirsten ............ 248/79 |
| 2,446,723 A | * | 8/1948 | Schaechterle .... 248/81 |
| 2,480,906 A | * | 9/1949 | Cox ................ 248/88 |
| 2,591,427 A | * | 4/1952 | Harkey ........... 248/79 |
| 2,592,053 A | | 4/1952 | Megla |
| 2,636,704 A | | 4/1953 | Norberg |
| 2,711,927 A | * | 6/1955 | Miller et al. .... 239/276 |
| 2,736,525 A | * | 2/1956 | Jones .............. 248/83 |
| 3,003,600 A | * | 10/1961 | MacKenzie ..... 52/633 |
| 3,056,571 A | * | 10/1962 | Schofield et al. .. 248/75 |
| 3,603,539 A | * | 9/1971 | Clegg, Jr. ........ 248/79 |
| 3,747,166 A | | 7/1973 | Eross |
| 3,809,348 A | * | 5/1974 | Di Laura ........ 248/49 |
| 4,403,758 A | * | 9/1983 | Burt ............... 248/49 |
| 4,666,109 A | * | 5/1987 | Fallon et al. ..... 248/50 |

(Continued)

FOREIGN PATENT DOCUMENTS

| | | |
|---|---|---|
| CA | 2485132 | 4/2005 |
| DE | 4228305 | 3/1994 |

*Primary Examiner* — Jonathan Liu
*Assistant Examiner* — Muhammad Ijaz
(74) *Attorney, Agent, or Firm* — Bennett Jones LLP

(57) ABSTRACT

The invention is directed to a combined protector and hose support device for a containment berm including an elongate bracket configured to be removably attached to the rim of the containment berm, and a saddle pivotally mounted to the bracket to engage the hose.

15 Claims, 6 Drawing Sheets

(56) References Cited

U.S. PATENT DOCUMENTS

| | | | | |
|---|---|---|---|---|
| 4,715,570 | A * | 12/1987 | Mashuda | 248/49 |
| 4,858,861 | A * | 8/1989 | Wilkinson, III | 248/74.1 |
| 5,788,193 | A * | 8/1998 | Hilbert | 248/80 |
| 6,076,778 | A * | 6/2000 | Brown | 248/49 |
| 6,109,569 | A | 8/2000 | Sakaida | |
| 6,206,613 | B1 * | 3/2001 | Elkins | 405/157 |
| 6,648,281 | B1 | 11/2003 | Lake | |
| 6,736,367 | B2 * | 5/2004 | Scobie | 251/149.9 |
| 7,908,809 | B2 * | 3/2011 | Meier | 52/367 |
| 7,926,768 | B2 * | 4/2011 | Prest | 248/80 |
| 8,052,098 | B1 | 11/2011 | Kowaleski | |
| 8,215,053 | B1 * | 7/2012 | Ohran | 47/2 |
| 8,286,892 | B1 * | 10/2012 | Schwanebek | 239/1 |
| 8,632,037 | B1 * | 1/2014 | Rael | 248/79 |
| 2005/0242245 | A1 * | 11/2005 | Balderama et al. | 248/65 |
| 2006/0231689 | A1 * | 10/2006 | Caminita | 248/62 |
| 2012/0000914 | A1 * | 1/2012 | Barrett et al. | 220/573 |
| 2013/0220328 | A1 * | 8/2013 | Jablonski | 128/205.25 |
| 2015/0096980 | A1 * | 4/2015 | Laing et al. | 220/9.4 |

* cited by examiner

COMBINED PROTECTOR AND HOSE SUPPORT DEVICE FOR CONTAINMENT BERM

CROSS REFERENCE TO RELATED APPLICATIONS

This application claims the priority benefit of Canadian Patent Application No. 2,770,929 filed on Mar. 12, 2012 entitled "Combined Protector and Hose Support Device for Containment Berm," the contents of which are incorporated herein by reference.

FIELD OF THE INVENTION

The present invention relates to a combined protector and hose support device for a containment berm.

BACKGROUND OF THE INVENTION

Above-ground storage tanks are widely utilized to store petroleum, fuel oil, sludge, oil refuse, oil mixed with wastes, oils or greases of animal, fish or marine origin, vegetable oils, synthetic oils, mineral oils, chemicals, and the like. Leakage or spillage of such petroleum products, chemicals, hazardous substances and wastes poses a significant threat to workers, the workplace and the environment. Consequently, efforts have been made by petroleum industry workers, chemical industry workers, transportation industry workers, military personnel, and other workers involved in liquid containment to guard against environmental contamination resulting from undesired release into the environment of various liquids and chemicals.

Government environmental regulations require installation of approved secondary containment systems for both temporary and permanent storage tanks to contain the escape of tank contents in case of an accident. A typical containment berm system includes an enclosure positioned about the storage tank and is constructed from materials which are chemically compatible and resistant to the tank contents. Such materials generally include a non-permeable fabric or liner which is attached to a supporting structure that maintains the fabric or liner in a shape suitable for containing spilled tank contents.

In the process of transferring the tank contents from the storage tanks to vehicles parked outside of the containment area, the workman must connect a hose to the vehicle, drape the hose over the containment berm, cross over a stile to access the containment area, and drag the hose over the containment berm to the storage tank in order to hook-up the hose to the tank. After the transfer of tank contents has been completed, the workman must disconnect the hose from the tank, drape the hose back over the containment berm, cross back over the stile, and drag the hose back over the containment berm to the vehicle. However, draping of the hose on either side of the containment berm so that the hose is oriented downwardly allows residual tank contents within the hose to drip or spill onto the workman or ground. In addition, the fabric or liner is susceptible to fraying or tearing as the hose is pulled over the containment berm. The hose itself and the rim of the containment berm may also be damaged. Holding the hose upright to avoid drips and spills requires additional workmen to assist in current transfer operations.

Accordingly, there is a need in the art for an apparatus which mitigates these limitations.

SUMMARY OF THE INVENTION

The present invention relates to a combined protector and hose support device for a containment berm.

In one aspect, the invention comprises a device for mounting on a containment berm and supporting a hose, the device comprising an elongate bracket configured to be attached to the rim of the containment berm, and a saddle pivotally mounted to the bracket to engage the hose, wherein the saddle is movable from a resting position to an actuation position wherein the saddle is oriented at an angle sufficient to enable holding of the hose in an upward direction.

In one embodiment, the bracket comprises an upper portion and parallel opposed side walls forming a channel on the underside of the bracket. In one embodiment, the upper portion and opposed side walls are curved.

In one embodiment, the upper portion defines a plurality of apertures to receive attachment means.

In one embodiment, the device further comprises an elongate plate having a length substantially similar to the length of the bracket and throughholes for alignment with the apertures of the upper portion.

In one embodiment, the bracket includes a neck which extends upwardly from one end of the upper portion and supports a downwardly sloping support member.

In one embodiment, the support member is oriented perpendicularly to the upper portion and side walls, and has first and second arms which protrude past the edges of the side walls.

In one embodiment, the first and second arms are inclined downwardly at an angle less than 90 degrees relative to the neck. In one embodiment, the angle ranges from about 20 degrees to less than about 90 degrees.

In one embodiment, the second arm is inclined downwardly at an angle which is less than the angle at which the first arm is inclined relative to the neck.

In one embodiment, the support member comprises aligned bores for receiving attachment means.

In one embodiment, the saddle comprises a substantially semi-circular collar adapted to complementarily engage the hose, and first and second spaced leg members. In one embodiment, the semi-circular collar has a substantially U-shaped cross-section and a curved inner surface generally complementary with the hose to engage a portion of the hose. In one embodiment, the first and second spaced leg members extend downwardly from the collar and define opposed openings for alignment with the bores of the support member to allow attachment means to extend therethrough.

In one embodiment, the device further comprises a tubular member spanning and mounted between the neck of the support member and a post in an orientation that is substantially parallel to and above the upper portion.

In one embodiment, the device comprises more than one support member and saddle.

In another aspect, the invention comprises a method of transferring flowable material to and from a storage tank using the above device.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF PREFERRED EMBODIMENTS

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

The term "horizontal" means the orientation of a plane or line that is substantially parallel to the plane of the horizon. The term "vertical" means the orientation of a plane or line that is substantially at a right angle to the horizontal plane.

Figure 1A:
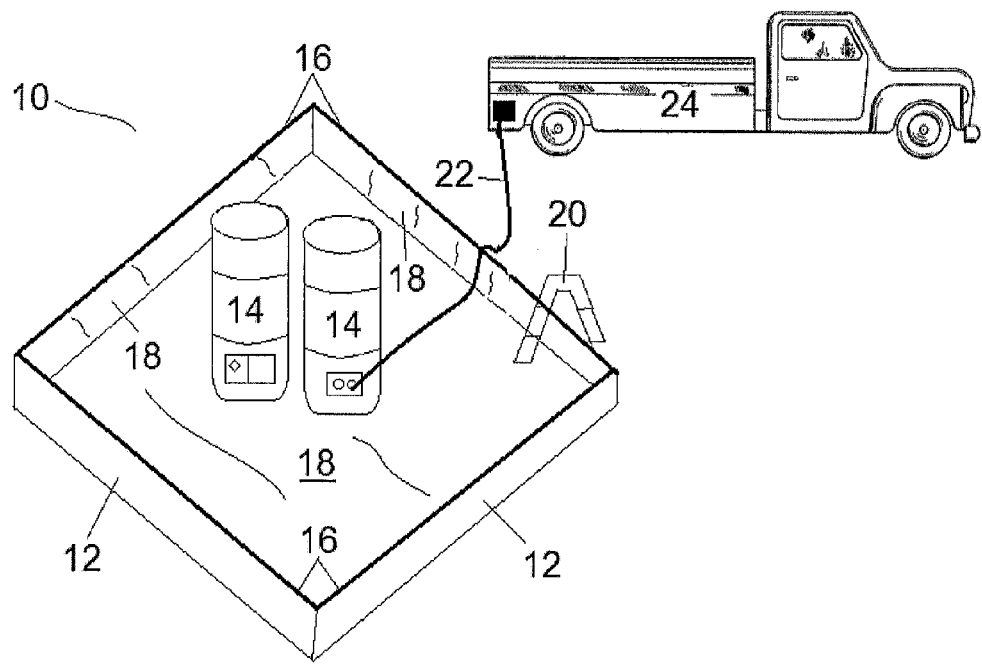
FIG. 1A is a perspective view of a conventional, prior art containment berm enclosing multiple storage tanks.

The present invention relates to a combined protector and hose support device for engagement with the rim of a containment berm. As used herein, the term "containment berm" refers to a physical barrier rising above the ground to encircle or otherwise surround a storage tank, and spaced apart from the tank for defining a retention basin about the tank. The term "ground" may comprise natural earthen materials, gravel, concrete, asphalt, synthetics, composites or plastics. As shown in FIG. 1A, a conventional containment berm (10) comprises a plurality of upstanding sidewalls (12) having sufficient height to provide the needed secondary containment capacity around the tank (14). The sidewalls (12) may form a round, oblong, square or rectangular-shaped containment around the tank (14). Each sidewall (12) typically comprises a galvanized steel sheet having a flanged top or rim (16), and double-bolted seams to maintain sidewall shape and failsafe seals.

A flexible, impermeable liner (18) covers the ground between the tank (14) and the containment berm (10), and the berm sidewalls (12) to control the dispersal of material spilled from the tank (14). The liner (18) is typically secured to the rim (16) of the berm sidewalls (12) by joining fasteners such as, for example, nuts and bolts. The liner (18) is formed of materials which are chemically compatible with the expected contents of the tank (14) and other environmental conditions. Suitable materials include, but are not limited to, polyethylene, polypropylene, polyurea, and the like. As used herein, the term "environment" is considered to include soil, groundwater, surface water, and air. An elevated stile or cross-over step (20) formed of plastic or other lightweight durable material is positioned over the berm (10) to allow personnel access to and from the containment area.

One or more storage tanks (14) may be installed within the containment area (i.e., a "tank farm"). As used herein, the term "storage tank" broadly refers to any fluid storage tank, which may be used to store petroleum, fuel oil, sludge, oil refuse, oil mixed with wastes, oils or greases of animal, fish or marine origin, vegetable oils, synthetic oils, mineral oils, chemicals, and the like. Although the storage tank (14) may have a generally cylindrical shape, the particular size, shape, and type of tank are not limitations of the invention. The storage tank (14) may include a water draw-off valve for use where water separation occurs in the tank and is to be drained off, or for internal cleaning operations; an outlet connection to which a hose (22) may be attached for transferring all or a portion of the tank contents to other storage tanks, vehicles (24) such as tank trucks, and the like; and a transfer pump for transferring such tank contents. The hose (22) typically is flexible and of sufficient length to extend from the outlet connection of the storage tank (14), traverse the sidewalls (12) of the containment berm (10), and attach to an inlet connection of a vehicle (24) such as, for example, a tank truck, which is parked outside of the containment area.

The combined protector and hose support device (26) of the present invention protects the rim (16) and liner (18) of the containment berm (10), and supports and protects the hose (22) traversing the sidewalls (12) of the containment berm (10). The device (26) is shown generally in FIGS. 2-5 to include an elongate bracket (28) configured to be removably attached to the rim (16) of the containment berm (10), and a saddle (30) pivotally mounted to the bracket (28) to engage the hose (22).

Figure 3:
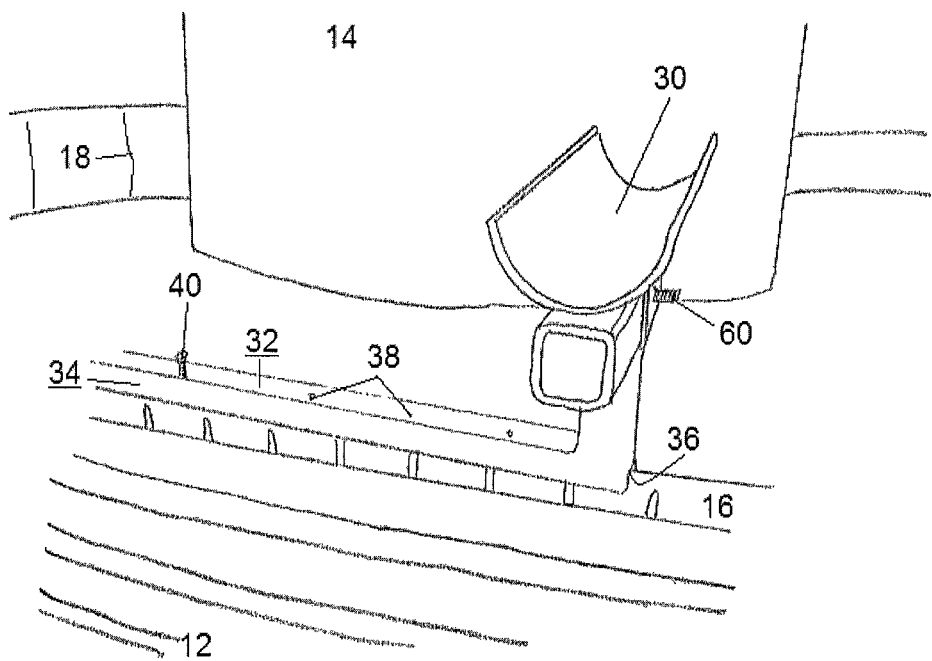
FIG. 3 is a front view of one embodiment of the present invention shown attached to the rim of the containment berm.

As shown in FIG. 3, the bracket (28) includes an upper portion (32) and parallel opposed side walls (34) forming a channel (36) on the underside of the bracket (28), resulting in an open-side-down "U" shaped cross-section of the bracket (28). The upper portion (32) and side walls (34) of the channel (36) may be sized and configured to mate with the rim (16) of the containment berm (10) to aid in the fastening of the bracket (28) to the rim (16) of the containment berm (10). The upper portion (32) defines a plurality of apertures (38)

through which attachment means (40) can extend into contact with an upper surface of the rim (16) of the containment berm (10).

Figure 8:
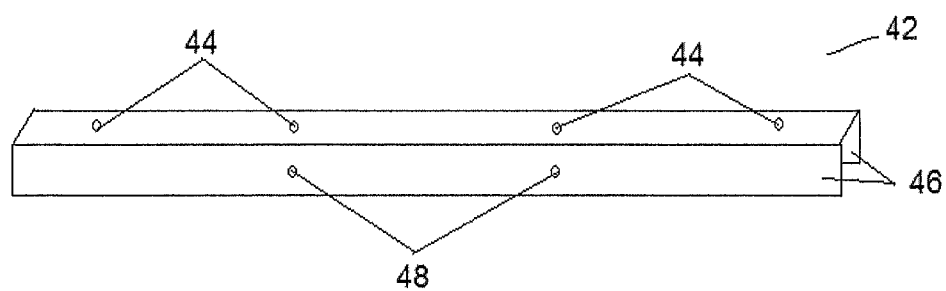
FIG. 8 is a side view of one embodiment of the plate for positioning on the underside of the containment berm rim.
Figure 9:
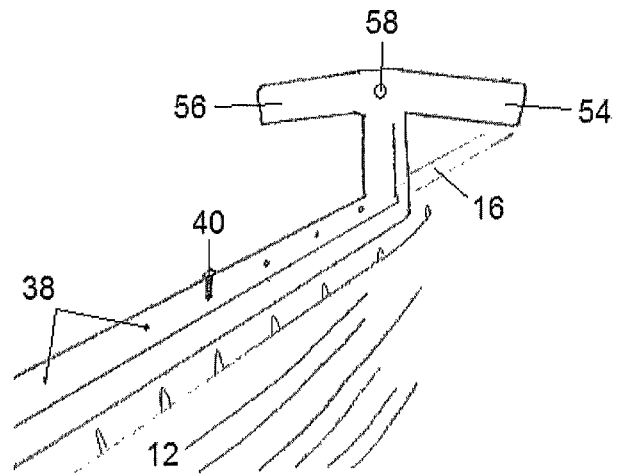
FIG. 9 is a side view of the bracket and support member without the saddle.

Suitable attachment means include, any suitable system or component that can be driven, screwed, or otherwise forced through the apertures (38) to attach the bracket (28) to the rim (16) of the containment berm (10), including without limitation, bolts, screws, rivets, or any other fasteners commonly used in construction. In one embodiment, when the bracket (28) is mounted over the rim (16) of the containment berm (10), passing fasteners (40) such as, for example screws, through the apertures (38) of the upper portion (32) secures the bracket (28) to the rim (16) of the containment berm (10). An elongate plate (42) having a length substantially similar to the length of the bracket (28) and throughholes (44) which align with the apertures (38) of the upper portion (32) may be positioned on the underside of the rim (16) to protect the rim (16), such that the fastener (40) passes in turn through the upper portion (32), the rim (16), and the plate (42). In one embodiment, the plate (42) comprises a flat bar. In one embodiment, the plate (42) comprises a substantially flat bar having throughholes (44), and side edges (46) with openings (48) through which attachment means may extend to allow the plate (42) to be secured to the rim (16), thereby preventing any side-to-side movement of the plate (42) underneath the rim (16) (FIG. 8). It will be appreciated by those skilled in the art that the length of the side edges (46) may vary. The device (26) can thus be readily attached to or released from the rim (16) of the containment berm (10).

Although less preferred, it is also contemplated that the bracket (28) may be attached to the rim (16) of the containment berm (10) via other means, such as for example, other fastening mechanisms or adhesives. If desired, the device (26) can be permanently attached if the device (26) is to be used regularly in a particular containment area.

Figure 4:
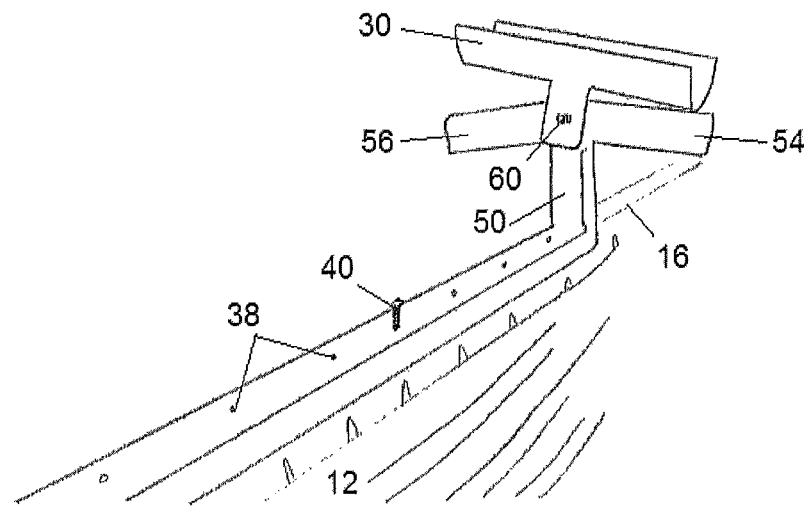
FIG. 4 is a side view of one embodiment of the present invention shown attached to the rim of the containment berm.
Figure 5:
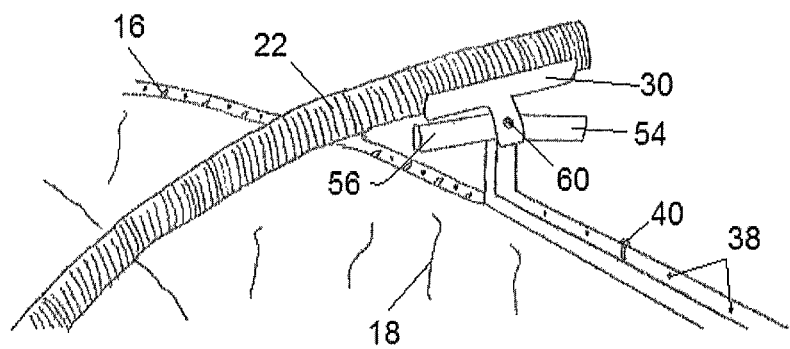
FIG. 5 is a side view of one embodiment of the present invention shown attached to the rim of the containment berm wherein a hose is held within the saddle inside the containment area.
Figure 6:
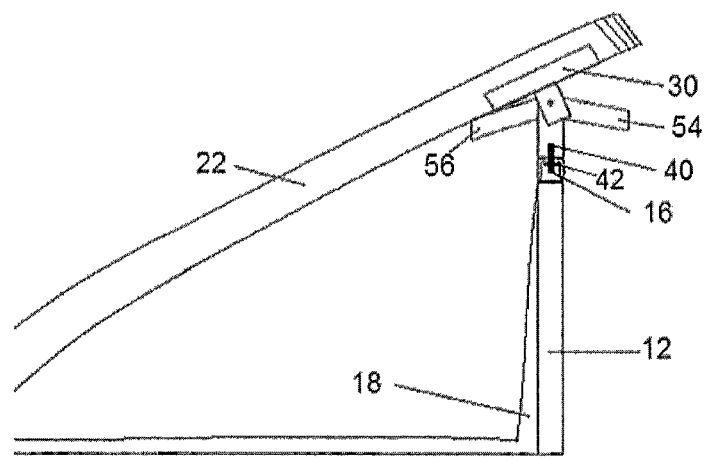
FIG. 6 is a side view of one embodiment of the present invention shown attached to the rim of the containment berm in an actuating position wherein a hose is held in an upward direction within the saddle inside the containment area.
Figure 7:
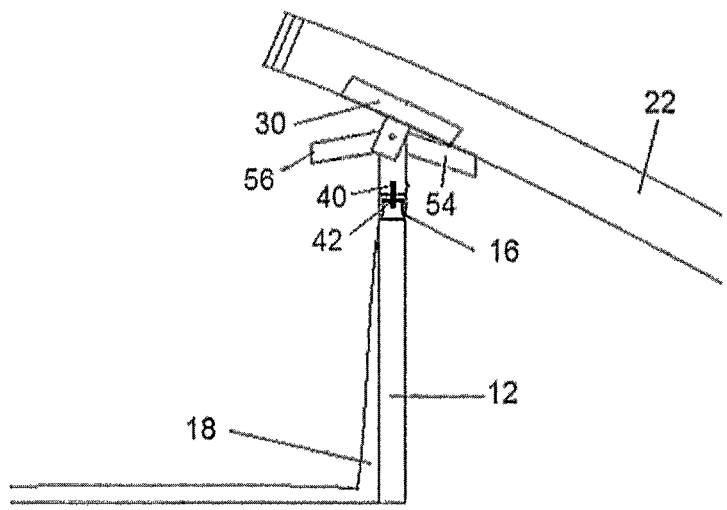
FIG. 7 is a side view of one embodiment of the present invention shown attached to the rim of the containment berm in an actuating position wherein a hose is held in an upward direction within the saddle outside the containment area.

The bracket (28) is substantially "L-shaped" and includes a neck (50) which extends upwardly from one end and supports a downwardly sloping support member (52). The support member (52) is oriented perpendicularly to the upper portion (32) and side walls (34), and has first and second arms (54, 56) which protrude past the edges of the side walls (34) to traverse the rim (16) of the containment berm (10). As shown in FIGS. 4-5, when the bracket (28) is mounted on the rim (16) of the containment berm (10), the first arm (54) projects outwardly over the outside of the containment area, whereas the second arm (56) projects outwardly over the inside of the containment area. The first and second arms (54, 56) are inclined downwardly at an angle less than 90 degrees relative to the neck (50). The angle may range from about 20 degrees to less than about 90 degrees. In one embodiment, the angle is about 20 degrees. In one embodiment, the second arm (56) is inclined downwardly at an angle which is less than the angle at which the first arm (54) is inclined relative to the neck (50).

In one embodiment, the first and second arms (54, 56) are preferably hollow to minimize the overall weight of the device (26). In one embodiment, the first and second arms (54, 56) have a substantially square cross-section. It is contemplated that the shape for an embodiment of the first and second arms (54, 56) may vary without departing from the scope and spirit of the present invention. The support member (52) has aligned bores (58) defined between the first and second arms (54, 56) through which a screw or bolt (60) may extend to pivotally mount the saddle (30). In one embodiment, the first and second arms (54, 56) may also have a solid body with a bore extending through the body for insertion of a screw or bolt to pivotally mount the saddle (30).

Figure 10:
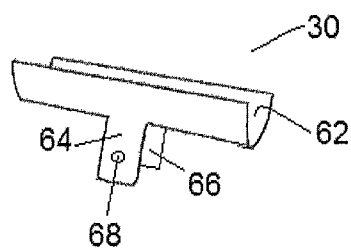
FIG. 10 is a side view of the saddle removed from the support member.

As shown in FIG. 10, the saddle (30) comprises a substantially semi-circular collar (62) adapted to complementarily engage a flexible hose (22), and first and second spaced leg members (64, 66). The semi-circular collar (62) has a substantially "U"-shaped cross-section and a curved inner surface generally complementary with the hose (22), so that the collar (62) may support the hose (22) and restrain it from moving laterally. It is contemplated that the size of the collar (62) for an embodiment of the device (26) may vary to accommodate any size of hose (22). The first and second spaced leg members (64, 66) extend downwardly from the collar and define opposed openings (68). The distance between the first and second leg members (64, 66) is slightly greater than the width of the first and second arms (54, 56) of the support member (52) to allow the saddle (30) to be mounted over the support member (52). The opposed openings (68) of the first and second leg members (64, 66) align with the bores (58) of the support member (52) to allow attachment means (60) such as, for example, a screw or pin, to extend therethrough to pivotally mount the saddle (30) to the support member (52).

The saddle (30) has a length which may be the same or smaller than the length of the support member (52). The saddle (30) may be pivoted relative to the support member (52), but any pivotal adjustment possible in the saddle (30) is limited by the support member (52). The inclination or pitch angle of the saddle (30) is adjustable within the physical constraints of the support member (52), but no side-to-side rotation, commonly referred to as the yaw angle, is possible. The saddle (30) is pivotally mounted to the support member (52) to enable three positions of movement, namely a resting position and two actuation positions. The saddle (30) is movable from the resting position wherein the saddle (30) is not tilted, to either of two actuation positions wherein the saddle (30) is tilted in the direction of either the first or second arms (54, 56) during use. As used herein and in the claims, the term "actuation position" refers to the saddle (30) being oriented at an angle sufficient to enable holding of the hose (22) in an upward direction, thereby preventing any spillage or leakage of tank contents from the hose (22) onto personnel and the ground inside or outside of the containment area.

Figure 11:
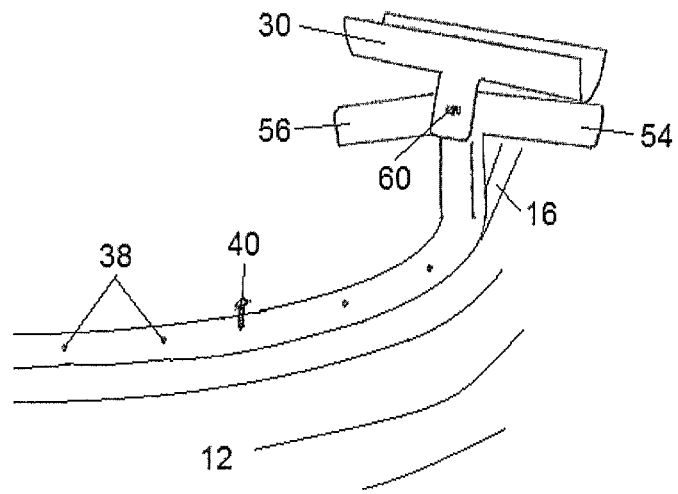
FIG. 11 is a side view of one embodiment of the present invention showing a curved upper portion and opposed side walls.

Embodiments of the device (26) in use are shown for example, in FIGS. 2-7 which show the device (26) mounted over the rim (16) of a substantially square or rectangular-shaped containment berm (10) around the tank (14). As is well known, the sidewalls (12) of containment berms (10) may also form a round or oblong-shaped containment around the tank (14). It is contemplated that the device (26) may be modified without departing from the scope and spirit of the present invention to accommodate curved rims (16) of containment berms (10). In one embodiment shown in FIG. 11, the upper portion (32) and opposed side walls (34) of the bracket (28) are curved to match the curvature of a round or oblong-shaped rim (16).

Figure 12:
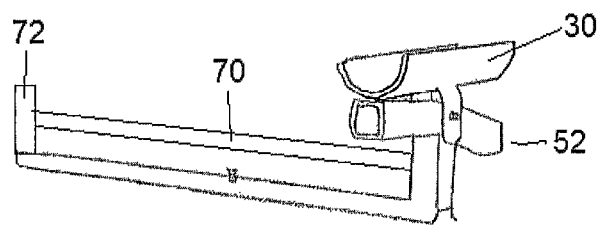
FIG. 12 is a side view of one embodiment of the present invention having a tubular member/roller and post.

In one embodiment shown in FIG. 12, the device (26) may include a tubular member or roller (70) which is shown spanning and mounted between the neck (50) of the bracket (28) and a post (72) in an orientation that is substantially parallel to and above the upper portion (32). The tubular member (70) has a length less than that of the upper portion (32). The tubular member (70) and post (72) may be formed of aluminum, steel, or other appropriate materials known to those skilled in the art, and may be attached to the device (26) by welding or other known techniques. The tubular member (70) facilitates a smooth movement as the hose (22) is slid over the tubular member (70) in either direction.

While standing outside of the containment area, the workman can conveniently hang the hose (22) over the tubular member (70), cross over the stile (20) to access the containment area, and easily pull the hose (22) over the tubular member (70) into the containment area for attachment to the outlet connection of the storage tank (14). Once the hose (22) is placed within the saddle (30) in an upward direction, the workman can leave the containment area by crossing back over the stile (20), remove the hose (22) from the saddle (30), and easily slide the hose (22) over the tubular member (70) for attachment to the inlet connection of a vehicle (24) to transfer the tank contents from the storage tank (14) to the vehicle (24).

Figure 13:
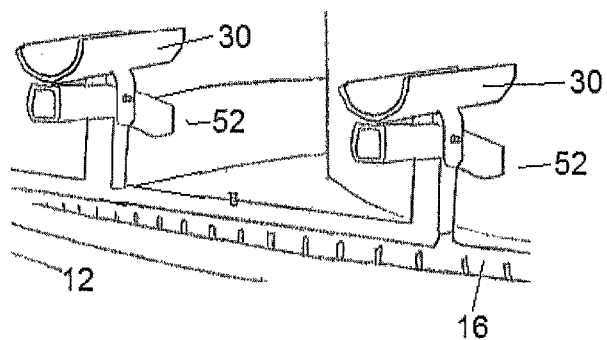
FIG. 13 is a side view of one embodiment of the present invention having multiple support members and saddles for use with multiple hoses.

In one embodiment, the device (26) may include more than one support member (52) and saddle (30) for use with multiple hoses (22) connected to respective storage tanks (14) within the same containment area; for example, a tank farm or oil depot may include multiple tanks (14) for storage of various liquid petroleum products or petrochemicals. As shown in FIG. 13, this configuration of the device (26) allows the workman to manipulate multiple hoses (22) in corresponding saddles (30) without spillage of any tank contents from the hoses (22), and negating the need to cross over the stile (20) multiple times to handle each hose (22) individually.

The device (26) can be constructed from any material or combination of materials having suitable properties such as, for example, mechanical strength, ability to withstand cold and adverse field conditions, corrosion resistance, and ease of machining. The device (26) may be formed of aluminum, steel, or other appropriate materials known to those skilled in the art. Preferably, the device (26) is formed of aluminum to ensure that the device (26) is as lightweight and portable as possible for easy handling by the workman. The fasteners such as for example, screws, pins, or bolts, may be formed of steel, for example, stainless steel, and strength-bearing materials.

The dimensions of the device (26) are not essential to the invention and are dictated by the various sizes, dimensions, and shapes of containment berm rims. Typically, the device (26) may be in the range of about one to about six feet in length, preferably about two to about five feet, and most preferably about three to about four feet.

The bracket (28) may be formed as a single, integral unit combining the upper portion (32), side walls (34), neck (50) and support member (52). In one embodiment, the support member (52) may be formed of two 5" pieces of tubing welded together at the desired angle relative to the neck (50) which is formed of a 6" piece of square tubing. The saddle (30), plate (42), and fasteners (60) are manufactured separately as components which are removably attachable to the bracket (28). In one embodiment, the saddle (30) may be manufactured by halving a pipe and welding the first and second spaced leg members (64, 66) to the underside of the pipe. The length of the first and second leg members (64, 66) may vary, depending upon the desired amount of slope. Any apertures (38), throughholes (44), openings (48, 68), and bores (58) may be made in the appropriate components using any hole-making operations known to those skilled in the art, including but not limited to drilling, reaming, tapping, boring, and the like. In general, the device (26) requires few components, making the device (26) amenable to rapid assembly and minimizing expense in manufacturing.

Figure 1B:
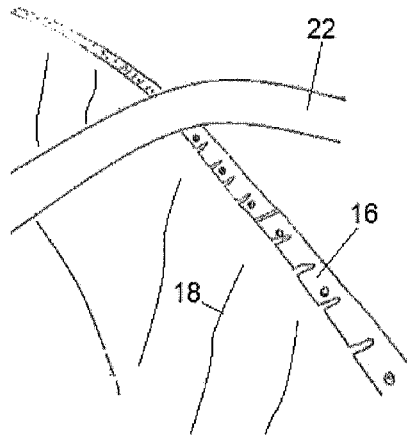
FIG. 1B is an enlarged view of a portion of the containment berm of FIG. 1A showing the hose traversing the rim of the containment berm.
Figure 2:
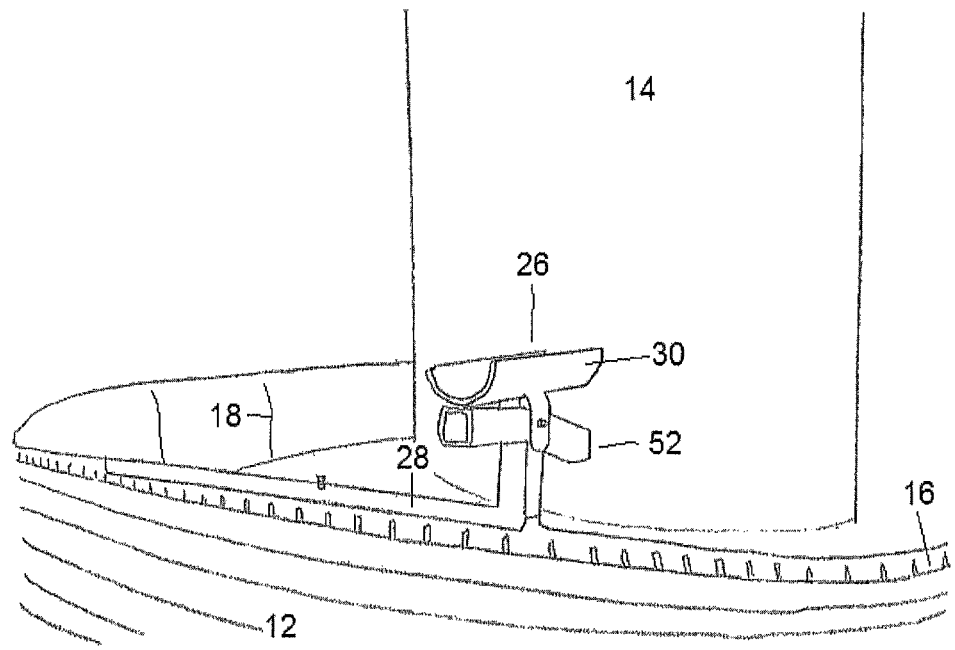
FIG. 2 is a side view of one embodiment of the present invention shown attached to the rim of the containment berm.

In operation, the device (26) is installed on the rim (16) of the containment berm (10) by placing the channel (36) of the bracket (28) over the rim (16), and securing the device (26) to the rim (16) for example, by driving fasteners (40) through the apertures (38) of the upper portion (32) and the plate (42) positioned on the underside of the rim (16). As is well known, the liner (18) is secured to the rim (16) by joining fasteners which typically protrude upwards from the rim (16) (FIG. 1B). Fasteners typically have sharp edges which obstruct or damage the hose (22), or catch and rip the workman's coveralls as the hose (22) is being pulled over the rim (16). The channel (36) of the bracket (28) effectively covers the protruding fasteners, preventing damage to the hose (22) and facilitating smooth running of the hose (22) over the upper portion (32) or tubular member/roller (70).

The vehicle (24) is maneuvered into position adjacent the containment area. The workman may cross over the stile (20) to access the containment area in order to attach the hose (22) to the outlet connection of the storage tank (14). The hose (22) is run from the storage tank (14) across the ground to the device (26). The saddle (30) is tilted in the direction of the second arm (56). The workman can place the hose (22) within the saddle (30) such that the hose (22) is held in an upward direction. Any residual tank contents remaining within the hose (22) from a previous transfer operation will thus run back into the hose (22), preventing spillage within the containment area. The workman can then cross back over the stile (20), remove the hose (22) from the saddle (30), and easily run the hose (22) smoothly over the upper portion (32) or tubular member/roller (70) to the vehicle (24) for hook-up. The saddle (30) is then tilted in the direction of the first arm (54).

Once the tank contents have been pumped and transferred from the storage tank (14) to the vehicle (24), the hose (22) is unhooked from the vehicle (24) and placed within the saddle (30) to be held in an upward direction. Any residual tank contents within the hose (22) thus run back into the hose (22) rather than spilling or leaking out onto personnel or the ground outside of the containment area. The workman can then cross back over the stile (20). The hose (22) may be either removed from the saddle (30) for storage within the containment area, or remain held within the saddle (30) for future transfer operations.

Ensuring that tank contents remain within the hose (22) thus enables safer, cleaner and more efficient transfer operations by minimizing human contact with hazardous liquids; and lessening the likelihood of worksite and environmental contamination due to leaking or spillage of tank contents, subsequent spill clean-up and its associated costs, fines, imprisonment, and halting of operations. The device (26) of the present invention protects not only the hose (22) traversing the containment berm (10), but also the rim (16) and liner (18) of the containment berm (10), and the workman's coveralls from damage. The device (26) omits the need and expenditure for additional drip berms, spill pads, trays, ground mats, or other berm accessories for placement inside or outside the containment area, or along the pathway of the hose (22) from the storage tank (14) to the vehicle (24). Further, the transfer operation can be performed easily by a single workman, since an additional person would not be needed to hold the hose upright to avoid spillage.

As will be apparent to those skilled in the art, various modifications, adaptations and variations of the foregoing specific disclosure can be made without departing from the scope of the invention claimed herein.

What is claimed is:

1. A device for mounting on a containment berm and supporting a hose, the device comprising:
   i) an elongate substantially L-shaped bracket comprising:
      a) an elongate upper portion and parallel opposed elongate side walls forming a channel on the underside of the bracket through which attachment means are received such that the bracket is configured to be attached to a rim of the containment berm, and b) a neck which extends upwardly from one end of the upper portion and supports a downwardly sloping support member thereabove;

ii) the support member having first and second arms which protrude past the edges of the side walls such that the neck and the support member form substantially a T-shape; and iii) a saddle pivotally mounted at a central pivot directly to and above the support member and being tiltable in a see-saw motion about the pivot in the direction of either the first or second arms of the support member such that the saddle is movable from a resting position to an actuation position wherein the saddle is capable of being oriented at an angle sufficient to engage the hose to rest in an upward direction when in use;

the support member and saddle both being oriented perpendicularly to the upper portion and side walls, wherein the perpendicular orientation enables traversal of the hose over the containment berm when in use;

wherein when the device is attached to the containment berm, the hose rests upwardly within the saddle to prevent spillage of residual contents of the hose.

2. The device of claim 1, wherein the upper portion defines a plurality of apertures to receive attachment means.

3. The device of claim 1, further comprising an elongate plate having a length substantially similar to the length of the bracket and throughholes for alignment with the apertures of the upper portion.

4. The device of claim 2, wherein the first and second arms are inclined downwardly at an angle less than 90 degrees relative to the neck.

5. The device of claim 4, wherein the angle ranges from about 20 degrees to less than about 90 degrees.

6. The device of claim 4, wherein the second arm is inclined downwardly at an angle which is less than the angle at which the first arm is inclined relative to the neck.

7. The device of claim 2, wherein the support member comprises aligned bores for receiving attachment means.

8. The device of claim 1, wherein the saddle comprises a substantially semi-circular collar adapted to complementarily engage the hose, and first and second spaced leg members.

9. The device of claim 8, wherein the semi-circular collar has a substantially U-shaped cross-section and a curved inner surface generally complementary with the hose to engage a portion of the hose.

10. The device of claim 9, wherein the first and second spaced leg members extend downwardly from the collar and define opposed openings for alignment with the bores of the support member to allow attachment means to extend therethrough.

11. The device of claim 3, wherein the upper portion and opposed side walls are curved.

12. The device of claim 3, further comprising a tubular member spanning and mounted between the neck of the support member and a post in an orientation that is substantially parallel to and above the upper portion.

13. The device of claim 1, comprising more than one support member and saddle.

14. A method of preventing spillage of residual contents of a hose and protecting the hose and containment berm from damage before and after the transfer of fluid using the device of claim 1 comprising:
mounting the device on the containment berm;
placing an end of the hose in an upward direction within the device, wherein the saddle is oriented at an angle sufficient to hold the hose in the upward direction to prevent spillage of residual contents of the hose;
removing the end of the hose from within the device; and
running the hose over the device into a containment area.

15. The method of claim 14, further comprising:
placing the end of the hose in the upward direction within the device, wherein the saddle is oriented at an angle sufficient to hold the hose in the upward direction to prevent spillage of hose contents;
removing the end of the hose from the device; and
running the hose over the device to outside the containment area.

* * * * *